United States Patent Office 3,513,187
Patented May 19, 1970

3,513,187
NEW DERIVATIVES OF ESTERS OF N-SUBSTITUTED ALPHA-AMINO ACIDS
Paul Viennois, Lyon, France, assignor to Laboratoires Novalis, Oullins, Rhone, France, a French company
No Drawing. Filed Aug. 10, 1964, Ser. No. 388,711
Claims priority, application Great Britain, Aug. 3, 1963, 31,896/63
Int. Cl. C07c *101/104, 103/28*
U.S. Cl. 260—471                                    3 Claims

ABSTRACT OF THE DISCLOSURE

Compounds of formula

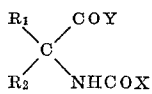

in which $R_1$ is an alkyl having at most three carbon atoms or a phenyl, $R_2$ is a phenyl, or a p-chlorophenyl, or $R_1$ and $R_2$ together form a five or a six member ring, Y is —$OR_3$ or —$NH_2$ or

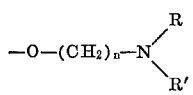

wherein $R_3$, R and R' are an alkyl having at the most four carbon atoms, and $n$ is equal to 2 or 3 and X is $NHR_4$ or $R_5$ or the trimethoxyphenyl, $R_4$ is hydrogen or a phenyl and $R_5$ is an alkyl of one to three carbon atoms, have tranquilizing, sedative activity and potentiate the hypnotic activity of nembutal. Very valuable is the compound ethyl α-phenyl-α-ethyl α-propionamido butyrate which is not toxic even at the dose of 1.0 g./kg. of body weight.

The present invention relates to the derivative products of esters of N-substituted alpha-amino-acids, corresponding to the following general formula:

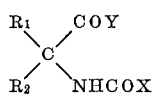

in which: $R_1$ is an alkyl radical having at most 3 atoms of carbon, or the phenyl radical; $R_2$ is the phenyl radical, or phenyl substituted in para by a chlorine atom; or alternatively, $R_1$ and $R_2$ may form together a pentagonal or hexagonal cycle with the carbon atom in alpha; Y is —$OR_3$ or —$NH_2$ or

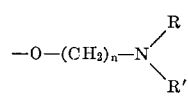

$R_3$, R or R' being an alkyl radical having at most 4 atoms of carbon, and $n$ being equal to 2 or 3; and X is $NHR_4$ or $R_5$, or the trimethoxy-phenyl radical, $R_4$ representing an atom of hydrogen or the phenyl radical and $R_5$ being an alkyl radical with 1 to 3 atoms of carbon inclusive.

The present invention also relates to the pharmaceutical compositions containing one of the compounds according to the invention, associated with acceptable and non-toxic pharmaceutical bases, these compounds being especially useful by reason of their central depressive activity, due to their extremely low toxicity (they have been tried out in doses of 50 and 100 mg./kg. with complete harmlessness).

The present invention further relates to a method of preparation of the compounds specified above.

This method consists:

(a) In synthesizing hydantoins having the formula:

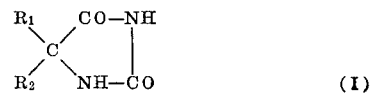   (I)

by condensation of the corresponding ketone with a sodium cyanide and ammonium carbonate;

(b) In hydrolyzing the hydantoins obtained by baryta-water or by soda to amino-acids (efficiency of the order of about 75%), having the formula:

   (II)

(c) In esterifying the amino-acids formed by heating to reflux in a quantity of an anhydrous alcohol $R_3OH$ saturated with gaseous hydrochloric acid, so as to form the esters (efficiency of the order of 52 to 83%):

   (III)

in the form of hydrochloride;

(d) Either in converting the esters obtained by the action of potassium cyanate or phenyl isocyanate to ureide derivatives having the formula:

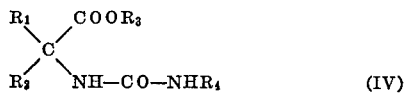

(d') Or in converting the esters obtained by an anhydride of carboxylic acid or of an acid chloride to N-acylated derivatives (efficiency of the order of 90 to 100%) having the formula:

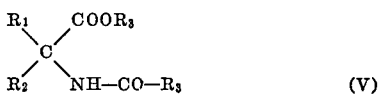

In the Formulae I to V, $R_1$ to $R_5$ have the same meaning as defined above.

Starting from these latter compounds, the corresponding amides can be obtained by alkaline hydrolysis to the corresponding N-acylated acids (efficiency from 90 to 100%):

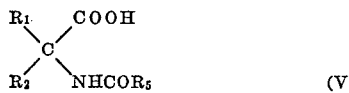

followed by dehydration by heating to reflux in acetic anhydride to azlactones (efficiency of about 80%):

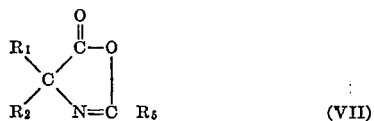

which is treated with concentrated ammonia so as to give the amides (efficiency from 50 to 60%):

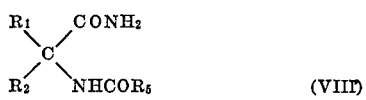

EXAMPLE 1

Ethyl-5 phenyl-5 hydantoin: (Formula I, in which $R_1=C_2H_5$; $R_2=C_6H_5$).

67 grams of propiophenone (0.5 mol.) in 700 ml. of ethyl alcohol, 50 grams of sodium cyanide (more than 1 mol.) in 100 ml. of water, and 200 grams of ammonium carbonate (more than 2 mols.) in 500 ml. of water, are heated in a water-bath to 60° C. for 3 hours. After having allowed the temperature of the bath to increase to 80° C., the solution is filtered and then concentrated under vacuum until precipitation begins, and finally it is cooled. The hydantoin precipitated is filtered and dried and then re-crystallized in a mixture of alcohol and water.

Efficiency: 60.3 grams (60%); Melting point: 200–204° C.

EXAMPLE 2

Amino-2 phenyl-2 butyric acid (Formula II in which $R_1=C_2H_5$ and $R_2=C_6H_5$).

97.5 grams of hydantoin obtained in Example 1 (0.48 mol.) dissolved in a solution of 455 grams of barium hydroxide (1.44 mol.) in 1160 ml. of water are heated for 18 hours at a pressure of 250 mm. of mercury. After filtration while hot, the filtrate is neutralized with sulphuric acid, the barium sulphate formed is eliminated, and the solution is concentrated under vacuum until precipitation begins.

Efficiency in filtered and dried acid=46 grams; Melting point=240° C.

The mother liquors, after evaporation under vacuum still yield 10 grams of acid containing impurities and mineral salts.

EXAMPLE 3

Amino-2 phenyl-2 ethyl butyrate (Formula III in which $R_1=C_2H_5$; $R_2=C_6H_5$; $R_3=C_2H_5$).

28 grams of acid obtained in Example 2 in 560 ml. of absolute ethyl alcohol saturated with dry acid are heated to reflux for 4 hours.

The residue obtained after evaporating-off the excess alcohol and hydrochloric acid is treated with the minimum quantity of water. The free ester is extracted from the aqueous solution, neutralized with sodium bicarbonate in ether, which is then evaporated.

Efficiency=22 grams (68%); Index of refraction at 21° C.: $n^{21}=1.5055$.

EXAMPLE 4

Ureide-2 phenyl-2 ethyl butyrate (Formula IV in which $R_1=C_2H_5$; $R_2=C_6H_5$; $R_3=C_2H_5$; $R_4=H$).

3.5 grams of ester obtained in Example 3 in 75 ml. of chloroform, 9.4 grams of potassium cyanate and 4.5 grams of pure acetic acid are stirred for 3 hours at the ambient temperature. The solution is then filtered and evaporated under vacuum. The residue treated with 25 ml. of water gives 3.5 grams of ureide derivative collected by filtration.

Melting point=176° C. (after re-crystallization in alcohol).

EXAMPLE 5

Phenyl ureide-2 phenyl-2 ethyl butyrate (Formula IV in which $R_1=C_2H_5$; $R_2=C_6H_5$; $R_3=C_2H_5$ and $R_4=C_6H_5$).

To 2.5 grams of ester (0.0121 mol.) obtained in Example 3 in 30 ml. of ether, there are added 1.58 grams of phenyl isocyanate. The reaction is exothermic and from the ether 3.2 grams of product are rapidly precipitated.

Melting point=180–182° C. (After re-crystallization in a mixture of alcohol and water).

EXAMPLE 6

Acetamido-2 phenyl 2 ethyl butyrate (Formula V in which $R_1=C_2H_5$; $R_2=C_6H_5$; $R_3=C_2H_5$ and $R_5=CH_3$).

To 10 grams of ester (0.0483 mol.) obtained in Example 3 in 50 ml. of benzene are added 5.4 grams of acetic anhydride (0.053 mol.). The reaction is exothermic. After cooling, the mixture is heated for one hour to reflux and then evaporated dry so as to give 11.55 grams of practically pure N-acetylated ester.

Melting point=102–104° C. (after re-crystallization in a mixture of alcohol and water).

EXAMPLE 7

Propionamide-2 phenyl-2 ethyl butyrate (Formula V in which $R_1=C_2H_5$; $R_2=C_6H_5$; $R_3=C_2H_5$ and $R_5=C_2H_5$).

28 grams of ester obtained in Example 3, and 19 grams of propionic anhydride are heated for one hour to reflux in 140 ml. of benzene. When the benzene has been evaporated, the residual oil poured into water crystallizes so as to give 33 grams (93%) of N-acylated crude ester.

Melting point=76–80° C. (after re-crystallization in the benzene-hexane mixture).

EXAMPLE 8

Propionamido-2 phenyl-2 butyric acid. (Formula VI in which $R_1=CH_5$; $R_2=C_6H_5$; $R_5=C_2H_5$).

21 grams of N-acylated ester obtained in Example 7, and 4.7 grams of soda are heated for one hour to reflux in a mixture constituted by 80 ml. of ethanol (95%) and 13 ml. of water. The solvent is then evaporated under vacuum and the residue obtained is dissolved in water. From this solution, acidified with hydrochloric acid, is obtained an abundant white precipitate which is re-crystallized in absolute alcohol (needles).

Efficiency=13.2 grams (70%); melting point =202–204° C.

Calculated (percent): C, 66.38; H, 7.23; N, 5.96. Found (percent): C, 66.46; H, 7.46; N,6.15.

EXAMPLE 9

Diethyl-2, 4 phenyl-4 oxazoline-2 one-5 (azlactone).

13.1 grams of propionamido-2 phenyl-2 butyric acid obtained in Example 8 are heated for 25 minutes to reflux in 32 ml. of acetic anhydride. The latter is evaporated under vacuum and the yellow oil obtained is distilled.

Boiling point=146–147° C. at 12 mm. of mercury; $n^{24}=1.5095$; efficiency=9.6 grams (79%);

Calculated (percent): N, 6.45. Found (percent): 6.63.

EXAMPLE 10

Propionamide-2 phenyl-2 butyramide.

3.25 grams of azlactone obtained in Example 9 in 50 ml. of ether and 45 ml. of concentrated technical ammonia are stirred for one hour. After evaporation of the ether and the ammonia, the white product obtained crystallizes in brilliant flakes in the benzene.

Melting point=142° C.; efficiency=1.83 grams (54%).

By following the process described in the preceding examples, there have also been prepared the compounds referred to in Tables I, II and III which follow below. The operating conditions (re-crystallizing solvent), the melting points and the analyses of these compounds are also given in the tables referred to.

TABLE I $$\begin{array}{c} R_1 \diagdown \quad \diagup COOR_3 \\ C \\ R_2 \diagup \quad \diagdown NHCONHR_2 \end{array} \quad (IV)$$

| Compound No. | $R_1$ | $R_2$ | $R_3$ | $R_4$ | Empirical formulae | Melting point, °C. | Recrystalisation solvent | C Percent Calculated C | C Percent Found T | H Percent Calculated C | H Percent Found T | N Percent Calculated C | N Percent Found T |
|---|---|---|---|---|---|---|---|---|---|---|---|---|---|
| $IV_1$ | $CH_2$–$CH_2$–$CH_2$–$CH_2$– | | $C_2H_5$ | $C_6H_5$ | $C_{15}H_{20}N_2O_3$ | 150 | Alcohol | | | | | | |
| $IV_2$ | $CH_2$–$CH_2$–$CH_2$–$CH_2$– | | $C_4H_9$ | H | $C_{11}H_{20}N_2O_3$ | 102 | do | 57.89 | 57.47 | 8.77 | 8.83 | 12.28 | |
| $IV_3$ | $CH_2$–$CH_2$–$CH_2$–$CH_2$– | | $C_4H_9$ | $C_6H_5$ | $C_{17}H_{24}N_2O_3$ | 174–176 | Alcohol-water | 67.11 | 66.93 | 7.89 | 7.74 | 89.21 | 9.23 |
| $IV_4$ | $CH_2$–$CH_2$–$CH_2$–$CH_2$–$CH_2$– | | $C_2H_5$ | H | $C_{10}H_{18}N_2O_3$ | 153 | Alcohol | | | | | | |
| $IV_5$ | $CH_2$–$CH_2$–$CH_2$–$CH_3$–$CH_2$– | | $C_2H_5$ | $C_2H_5$ | $C_{16}H_{22}N_2O_3$ | 174–176 | Alcohol-water | 66.24 | 66.42 | 7.59 | 7.49 | 9.66 | 9.81 |
| $IV_6$ | $CH_2$–$CH_2$–$CH_2$–$CH_2$–$CH_2$– | | $C_4O_3$ | H | $C_{12}H_{22}N_2O_3$ | 122 | Alcohol | 59.50 | 59.30 | 9.09 | 9.15 | 11.6 | 11.72 |
| $IV_7$ | $CH_3$ | $C_6H_5$ | $C_2H_5$ | $C_6H_5$ | $C_{12}H_{24}H_2O_3$ | 170–172 | Alcohol water | | | | | 8.97 | 9.05 |
| $IV_8$ | $CH_3$ | $C_6H_5$ | $C_4H_9$ | H | $C_{14}H_{20}N_2O_3$ | 128 | Alcohol | 63.63 | | 7.58 | | 10.66 | 10.74 |
| $IV_9$ | $CH_3$ | $C_6H_5$ | $C_4H_9$ | $C_6H_5$ | $C_{20}H_{24}N_2O_3$ | 160 | do | | | | | 8.23 | 8.58 |
| $IV_{10}$ | $CH_3$ | $ClC_6H_4$ | $C_2H_5$ | H | $C_{12}H_{15}ClN_2O_3$ | 164 | do | 53.31 | 53.20 | 5.55 | 5.57 | 10.35 | |
| $IV_{11}$ | $C_2H_5$ | $C_6H_5$ | $C_4H_9$ | H | $C_{13}H_{18}H_2O_3$ | 177–178 | do | | | | | | |
| $IV_{12}$ | $C_2H_5$ | $C_6H_5$ | $C_2H_5$ | $C_6H_5$ | $C_{19}H_{22}N_2O_3$ | 180–182 | do | | | | | | |
| $IV_{13}$ | $C_2H_5$ | $C_6H_5$ | $C_4H_9$ | $C_6H_5$ | $C_{21}H_{26}N_2O_3$ | 140 | Alcohol-water | 71.19 | 71.22 | 7.34 | 7.41 | 7.91 | 7.96 |

TABLE II $$\begin{array}{c} R_1 \diagdown \phantom{x} \diagup COOR_3 \\ C \\ R_2 \diagup \phantom{x} \diagdown NHCOR_5 \end{array} \quad (V)$$

| Compound No. | $R_1$ | $R_2$ | $R_5$ | $R_3$ | Name | Melting point, °C. | Recrystallisation solvent | C percent Calc. | C percent Found | H percent Calc. | H percent Found | N percent Calc. | N percent Found |
|---|---|---|---|---|---|---|---|---|---|---|---|---|---|
| $V_1$ | $\begin{array}{c}CH_2-CH_2\\ \phantom{xx}\diagdown \\ CH_2-CH_2\end{array}$ | | $CH_3$ | $-C_4H_9$ | Acetamide-1 cyclopentane butyl carboxylate | 86 | Benzene-hexane | 63.44 | 63.45 | 9.25 | 9.17 | 6.17 | 6.10 |
| $V_2$ | $\begin{array}{c}CH_2-CH_2\\ \phantom{x}\diagdown \\ CH_2 \phantom{xxx}\\ \phantom{x}\diagup \\ CH_2-CH_2\end{array}$ | | $CH_3$ | $-C_4H_9$ | Acetamide-1 cyclohexane butyl carboxylate | 104 | ......do...... | 64.73 | 64.75 | 9.45 | 9.40 | 5.81 | 5.78 |
| $V_3$ | $CH_3$ | $C_6H_5$ | $CH_3$ | $C_2H_5$ | Acetamide-2 phenyl-2 ethyl propionate | 76-78 | Ethanol-water | 66.38 | 66.58 | 7.23 | 7.34 | 5.96 | 1.07 |
| $V_4$ | $C_2H_5$ | $C_6H_5$ | $C_2H_5$ | $C_2H_5$ | Propionamide-2 phenyl-2 ethyl propionate | 70 | Hexane | 67.47 | 67.64 | 7.63 | 7.59 | 5.62 | 5.77 |
| $V_5$ | $CH_3$ | $C_6H_4Cl$ | $CH_3$ | $C_2H_5$ | Acetamide-2 (p-chlorophenyl)-2 ethyl propionate | 104-105 | Ethanol | 55.88 | 58.00 | 5.96 | 5.95 | 5.21 | 5.24 |
| $V_6$ | $C_2H_5$ | $C_6H_4Cl$ | $CH_3$ | $C_2H_5$ | Propionamide-2 (p-chlorophenyl)-2 ethyl propionate | 85 | Ethanol-water | 59.26 | 59.19 | 6.35 | 6.31 | 4.94 | 4.96 |
| $V_7$ | $CH_3$ | $C_6H_5$ | $C_2H_5$ | $C_2H_5$ | Acetamide-2 phenyl-2 ethyl butyrate | 104 | ......do...... | 67.47 | 67.35 | 7.63 | 7.57 | 5.62 | 5.57 |
| $V_8$ | $C_2H_5$ | $C_6H_5$ | $C_2H_5$ | $C_2H_5$ | Propionamide-2 phenyl-2 ethyl butyrate | 76-80 | Benzene-hexane | 68.44 | 68.19 | 7.98 | 7.97 | 5.32 | 5.44 |
| $V_9$ | $C_2H_5$ | $C_6H_5$ | $C_3H_7(n)$ | $C_2H_5$ | Butyramide-2 phenyl-2 ethyl butyrate | 76 | Hexane | 69.32 | 69.35 | 8.30 | 8.42 | 5.05 | 5.23 |
| $V_{10}$ | $C_2H_5$ | $C_6H_5$ | $C_3H_7(i)$ | $C_2H_5$ | Isobutyramide-2 phenyl-2 ethyl butyrate | 64-65 | ......do...... | 69.32 | 69.25 | 8.30 | 8.27 | 5.05 | 5.06 |
| $V_{11}$ | $C_2H_5$ | $C_6H_5$ | $C_6H_2(OCH_3)_3$ | $C_2H_5$ | (Trimethoxy-3'4'5') benzamide-2 phenyl-2 ethyl butyrate | 108-110 | ......do...... | 65.84 | 65.86 | 6.73 | 6.77 | 3.49 | 3.57 |
| $V_{12}$ | $C_2H_5$ | $C_6H_4Cl$ | $CH_3$ | $C_2H_5$ | Acetamide-2 (p-chlorophenyl)-2 ethyl butyrate | 122 | Ethanol-hexane | 59.26 | 59.39 | 6.35 | 6.42 | 4.94 | 5.04 |
| $V_{13}$ | $C_2H_5$ | $C_6H_4Cl$ | $C_3H_7(i)$ | $C_2H_5$ | Isobutyramide-2 (p-chlorophenyl)-2 ethyl butyrate | 90 | ......do...... | 60.50 | 60.27 | 6.72 | 6.76 | 4.67 | 4.70 |
| $V_{14}$ | $C_2H_5$ | $C_6H_5$ | $CH_3$ | $C_2H_5$ | Acetamide-2 phenyl-2 ethyl valerate | 125 | Hexane | 61.64 | 61.85 | 7.06 | 7.13 | 4.49 | 4.44 |
| $V_{15}$ | $nC_3H_7$ | $C_6H_5$ | $C_2H_5$ | $C_2H_5$ | Propionamide-2 phenyl 2 ethyl valerate | 88-90 | Methanol-water | 68.44 | 68.24 | 7.98 | 8.15 | 5.32 | 5.37 |
| $V_{16}$ | $nC_3H_7$ | $C_6H_5$ | $C_3H_7(n)$ | $C_2H_5$ | Butyramide-2 phenyl-2 ethyl valerate | 66-68 | ......do...... | 69.32 | 69.15 | 8.30 | 8.28 | 5.05 | 5.04 |
| $V_{17}$ | $CH_3$ | $C_6H_{11}$ | $C_2H_5$ | $C_2H_5$ | Acetamide-2 cyclohexyl-2 ethyl propionate | 76-68 | Hexane | 70.10 | 70.03 | 8.59 | 8.70 | 4.81 | 4.89 |
| $V_{18}$ | $C_6H_5$ | $C_6H_5$ | $CH_3$ | $C_2H_5$ | Propionamide-2,2 diphenyl-2.2 ethyl acetate | 90 | Ethanol | 64.73 | 64.65 | 9.54 | 9.38 | 5.81 | 5.83 |
| $V_{19}$ | $C_6H_5$ | $C_6H_5$ | $C_2H_5$ | $C_2H_5$ | Propionamide-2 diphenyl-2.2 ethyl acetate | 161 | ......do...... | 73.31 | 73.12 | 6.75 | 6.83 | 4.50 | 4.48 |
| $V_{20}$ | $\begin{array}{c}CH_2-CH_2\\ \phantom{xx}\diagdown \\ CH_2-CH_2\end{array}$ | | $CH_3$ | $-C_2H_5$ | Acetamide-1 cyclopentane ethyl carboxylate | 109 | Benzene-hexane | 60.30 | 60.52 | 8.55 | 8.62 | 7.04 | 7.01 |
| $V_{21}$ | $\begin{array}{c}CH_2-CH_2\\ \phantom{x}\diagdown \\ CH_2 \phantom{xxx}\\ \phantom{x}\diagup \\ CH_2-CH_2\end{array}$ | | $CH_3$ | $-C_2H_5$ | Acetamide-1 cyclohexane ethyl carboxylate | 120 | Alcohol-water | 61.97 | 61.85 | 8.92 | 8.95 | 6.50 | 6.78 |

TABLE III $$\begin{array}{c} R_1 \diagdown \quad \diagup CONH_2 \\ C \\ R_2 \diagup \quad \diagdown NHCOR_5 \end{array} \quad (VIII)$$

| Compound No. | $R_1$ | $R_2$ | $R_5$ | Name | Melting point, °C. | Recrystallisation solvent. | C Percent Calc. | C Percent Found | H Percent Calc. | H Percent Found | N Percent Calc. | N Percent Found |
|---|---|---|---|---|---|---|---|---|---|---|---|---|
| VIII$_1$ | 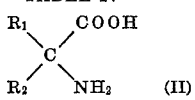 | | $CH_3$ | Acetamide-1-cyclopentane carbamide. | 219 | Ethanol | | | | | | |
| VIII$_2$ | $\begin{array}{c}CH_2-CH_2-\\ \mid \\ CH_2 \\ \mid \\ CH_2-CH_2-\end{array}$ | | $CH_3$ | Acetamide-1 cyclohexane carbamide. | 181 | Etanol, 50% | 58.69 | 58.74 | 8.69 | 8.65 | 15.22 | 15.19 |
| VIII$_3$ | $C_2H_5$ | $C_6H_5$ | $CH_3$ | Acetamide-2 phenyl-2 butyramide. | 177 | Ethanol, 50% | 65.45 | 65.63 | 7.28 | 7.18 | 12.73 | 12.84 |
| VIII$_4$ | $C_2H_5$ | $C_6H_5$ | $C_2H_5$ | Priopionamide-2-phenyl-2 butyramide. | 142 | Benzene | 66.66 | 66.75 | 7.69 | 7.75 | 11.97 | 11.82 |
| VIII$_5$ | $CH_3$ | $C_6H_5$ | $C_2H_5$ | Propionamide-2-phenyl-2-propionamide. | 157–158 | Ethanol, 20 % | 65.45 | 65.79 | 7.28 | 7.33 | | |

The following intermediate compounds obtained during the preparation of the final products referred to in Tables I, II and III, are also new.

TABLE IV $$\begin{array}{c} R_1 \diagdown \quad \diagup COOH \\ C \\ R_2 \diagup \quad \diagdown NH_2 \end{array} \quad (II)$$

| | $R_1$ | $R_2$ | Empirical formula | Melting point, °C. | Recrystallisation solvent |
|---|---|---|---|---|---|
| Compound No.: | | | | | |
| II$_1$ | $-CH_3$ | $ClC_6H_4-$ | $C_9H_{10}ClNO_2$ | 260 | Water-alcohol. |

TABLE V $$\begin{array}{c} R_1 \diagdown \quad \diagup COOR_3 \\ C \\ R_2 \diagup \quad \diagdown NH_2 \end{array} \quad (III)$$

| Compound No. | $R_1$ | $R_2$ | $R_3$ | Empirical formulae | Refractive index found |
|---|---|---|---|---|---|
| III$_1$ | 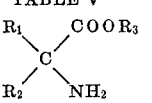 | | $C_4H_9$ | $C_{11}H_{21}NO_2$ | $1.450^{30}$ |
| III$_2$ | $CH_3$ | $C_6H_5$ | $C_4H_9$ | $C_{13}H_{19}NO_2$ | $1.4835^{25}$ |
| III$_3$ | $CH_3$ | $ClC_6H_4$ | $CH_3$ | $C_{10}H_{12}ClNO_2$ | $1.5270^{25}$ |
| III$_4$ | $CH_3$ | $ClC_6H_{11}$ | $C_2H_5$ | $C_{11}H_{14}ClNO_2$ | $1.5165^{25}$ |
| III$_5$ | $C_2H_5$ | $C_6H_5$ | $C_2H_5$ | $C_{12}H_{17}NO_2$ | $1.5055^{21}$ |
| III$_6$ | $C_2H_5$ | $C_6H_5$ | $C_4H_9$ | $C_{14}H_{21}NO_3$ | $1.4950^{21}$ |

PHARMACOLOGICAL TESTS

The central depressive activity of the ureide compounds (Formula IV) and of the N-acylated compounds (Formula V) according to the invention, has been determined by the following tests:

(1) Action on spontaneous motory activity

This study was carried out on rats or mice by means of the technique of "trembling cages," the movements being recorded during 24 hours for each test (see Boissier (J. R.) Therapie-1958, 13, 1074).

(2) Action on the position reflexes

This test is based on the time during which mice can hold themselves on a wooden rod of 20 mm. in diameter rotating on its axis at a slow speed. This standard test has been employed in the study of tranquilisers (see Kinnard (W. J.), Carr (C. J.)—J.P.E.T.—1957, 121, 354).

Pull-up test.—This test consists in suspending mice by the front feet from a metal wire stretched horizontally. It is assumed that there is a sedative effect when the animal is not able within five seconds to make a recovery which brings on the wire one and sometimes both hind feet (see Courvoisier (S) J. Clin. Exp. Psychopath. 1956, 17, 25).

(3) Potentialization of the hypnotic activity of nembutal

Nembutal is injected in a homogeneous selection of mice at a very small dose which does not induce sleep (20 mg./kg.). The test is positive when the prior administration (15 to 30 minutes) of the product to be tested permits this threshold dose of nembutal to induce sleep, the intensity and the duration of which are a functio nof the activity of the compound studied (see Boissier (J. R.) Actualites pharmacol. 1959, 12, 1).

(4) Inhibition of the Straub phenomenon (antimorphinic activity)

Known by the name of the Straub phenomenon, the catatonus of the tail, observed in mice treated with morphine (20 mg./kg.) is inhibited by certain tranquillisers ("Behactyzine") and compounds having an anticholinergic activity (see Boissier (J. R.) Therapie 1958, 13, 1074).

This test is also included in the screening tests adopted.

The results of these tests are given in Table VI below:

TABLE VI

| Compound: | Actography Trembling cages | Rotating rod test | Pulling test | Potentialization of Nembutal | Inhibition of Straub phenomenon |
|---|---|---|---|---|---|
| IV 8 | + | + | 0 | + | 0 |
| IV 12 | ++ | + | + | ++ | 0 |
| V 3 | ++ | 0 | + | ++ | 0 |
| V 4 | + | 0 | 0 | +++ | 0 |
| V 5 | ++ | + | + | +++ | 0 |
| V 7 | ++ | ++ | +++ | ++++ | 0 |
| V 8 | ++++ | +++ | +++ | ++++ | + |
| V 10 | ++ | 0 | + | + | 0 |
| V 12 | + | 0 | + | 0 | 0 |
| V 13 | + | 0 | 0 | + | 0 |
| V 14 | + | 0 | + | ++ | 0 |
| V 16 | + | 0 | + | ++ | 0 |
| V 17 | 0 | 0 | 0 | + | 0 |
| VIII 3 | + | + | ++ | ++ | 0 |
| VIII 4 | ++ | + | ++ | +++ | 0 |

Central depressive activity of derivatives tested. ++++ represents an activity of the order of ½th of that of the chloro-promazine used as a standard.

These comparative results show that a central activity can be clearly shown by means of the tests made with the ethyl esters of N-acylated amino-acids.

The effect is a maximum for the derivative No. V 8: propionamide-2 phenyl-2 ethyl butyrate.

The elongation of the main chain (ethyl valerates Nos. V 15 and V 16), of the N-acylated chain (butyramide-2, trimethoxy-benzamide-2, derivatives Nos. V 9, V 10 and V 11) or of the esterifying group (butyl esters, derivatives Nos. V 1 and V 2) has the effect of causing a definite reduction of the activity.

The replacement of the ester function by a primary amide function (—CO—NH$_2$) is also not advantageous: the derivatives VIII 3 and VIII 4 have a diminished activity as compared with that of the corresponding ethyl esters, and especially have a shorter period of action.

The results obtained with propionamide-2 phenyl-2 ethyl butyrate (No. V 8) are given below:

Acute general toxicity.—Administered by the mouth in mice (gastric intubation) at a dose of 1.0 g/kg., this compound possesses complete harmlessness. No mortality was observed on a group of 10 mice in the 8 days following this administration.

In the 24 hours following the administration of such a dose by the mouth, the mice treated behaved in an apparently normal manner.

Actography (mice):

NUMBER OF IMPULSES RECORDED ON THE METER

[Average of 10 tests]

| | Comparison group | Treated group (100 mg./kg. per bone) |
|---|---|---|
| One hour before test | 4,300 | 4,100 |
| 30 minutes after dosing | 3,900 | 310 |
| 90 minutes after dosing | 3,500 | 445 |
| 150 minutes after dosing | 4,700 | 2,100 |
| 210 minutes after dosing | 4,200 | 1,800 |
| 270 minutes after dosing | 3,400 | 3,100 |

Rota rod test:

| | Duration of test | | |
|---|---|---|---|
| | 15 mins. | 45 mins. | 120 mins. |
| Comparison group (10 mice) | 0 | 0 | 0 |
| Treated group (10 mice) | 3+ | 6+ | 5+ |

From this it is deduced that the dose used for the test corresponds substantially to the 50 per 100 effective dose (ED$_{50}$) under these experimental conditions.

Pulling test:

| | Duration of test | | | |
|---|---|---|---|---|
| | 15 mins. | 30 mins. | 60 mins. | 120 mins |
| Comparison group (10 mice) | 0 | 0 | 0 | 0 |
| Treated group (10 mice) | 3+ | 4+ | 6+ | 6+ |

It can be concluded that the dose used for the test (100 mg/kg. per bone) corresponds substantially to the 50 per 100 effective dose (ED$_{50}$) under these experimental conditions.

Potentialization of Nembutal:

| | Duration of test | | | |
|---|---|---|---|---|
| | 30 mins. | 45 mins. | 60 mins. | 120 mins. |
| | Number of mice drugged | | | |
| Comparison group (10 mice) nembutal 20 mg./kg. i-p | 1 | 0 | 0 | 0 |
| Treated group (10 mice) Compound No. V 8; Treated group (10 mice) Compound No. V 8; 100 mg./kg. per bone, 30 min. before the nembutal | 8 | 6 | 5 | 1 |
| Treated group (10 mice) Comp V 8; 100 mg./kg. per bone, 60 min. before the Nembutal | 10 | 9 | 9 | 6 |
| Treated group (10 mice) Comp V 8; 50 mg./kg. per bone, 60 min. before the nembutal | 6 | 5 | 2 | 2 |

These results show that in this test, the ED$_{50}$ is 50 mg./kg. for mice.

Investigation of secondary effects.—When administered by intravenous injection on a dog with a destroyed medulla, propionamide-2 ethyl butyrate (10 mg./kg.) has proved to have no activity on the blood pressure and the breathing.

Therapeutic application.—The derivatives referred to above can be employed for the treatment of illnesses resulting from the attack on the central nervous system (excessive nervous excitability, characteristic instability, insomnia, etc.).

They can be administered alone or in association with other active principles, by the mouth (pills, tablets, sugar-coated tablets) or by rectal administration.

The posology is of the order of 100 mg. per dose, at the rate of 2 to 10 doses per 24 hours.

What I claim is:

1. A compound of formula:

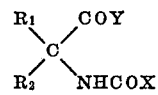

in which:

R$_1$ is an alkyl radical having at most 3 atoms of carbon, or the phenyl radical;

R$_2$ is the phenyl radical, or phenyl substituted in para by a chlorine atom;

Y is —OR₃ or —NH₂ or

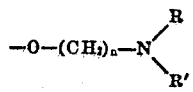

R₃, R or R′ being an alkyl radical having at most 4 atoms of carbon, and n being equal to 2 or 3;
and X is NHR₄ or R₅, or the trimethoxy-phenyl radical R₄ representing an atom of hydrogen or the phenyl radical, and R₅ being an alkyl radical with 1 to 3 atoms of carbon inclusive.

2. A compound according to claim 1 of formula

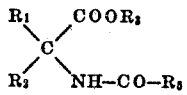

wherein R₁, R₂, R₃ and R₅ are as therein defined.

3. The compound according to claim 2 of formula

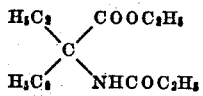

References Cited

UNITED STATES PATENTS

| | | | |
|---|---|---|---|
| 2,642,459 | 12/1948 | White | 260—534 |
| 2,663,713 | 3/1952 | White | 260—534 |
| 2,971,021 | 9/1961 | Schipper | 260—468 |
| 3,275,677 | 9/1966 | Allen et al. | 260—465 |
| 3,344,023 | 9/1967 | Reinhold et al. | 167—65 |

OTHER REFERENCES

Fiser et al. Organic Chemistry; D.C. Heath, Boston, 1944, pp. 614–15.

Noller, C. R. Chemistry of Organic Compounds; W. B. Saunders, Philadelphia, Pa., 1951 p. 635.

LORRAINE A. WEINBERGER, Primary Examiner

P. J. KILLOS, Assistant Examiner

U.S. Cl. X.R.

260—468, 557, 472, 558, 553, 309.5, 518, 307; 424—309

UNITED STATES PATENT OFFICE
CERTIFICATE OF CORRECTION

Patent No. 3,513,187          Dated May 19, 1970

Inventor(s)    Paul Viennois

It is certified that error appears in the above-identified patent and that said Letters Patent are hereby corrected as shown below:

Column 1, line 7, the priority date "Aug. 3, 1963," should read -- Aug. 13, 1963, --

SIGNED AND
SEALED
AUG 25 1970

(SEAL)
Attest:

Edward M. Fletcher, Jr.
Attesting Officer

WILLIAM E. SCHUYLER, JR.
Commissioner of Patents